US012163109B2

(12) United States Patent
Stokes et al.

(10) Patent No.: US 12,163,109 B2
(45) Date of Patent: Dec. 10, 2024

(54) ALKALINE CLEANING COMPOSITIONS COMPRISING AN ALKYLAMINO HYDROXY ACID AND/OR SECONDARY AMINE AND METHODS OF REDUCING METAL CORROSION

(71) Applicant: ECOLAB USA INC., Saint Paul, MN (US)

(72) Inventors: Jennifer Stokes, Saint Paul, MN (US); Carter M. Silvernail, Saint Paul, MN (US); Paul Frazer Schacht, Saint Paul, MN (US); Anthony W. Erickson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/352,341

(22) Filed: Jul. 14, 2023

(65) Prior Publication Data

US 2023/0357672 A1 Nov. 9, 2023

Related U.S. Application Data

(62) Division of application No. 17/454,577, filed on Nov. 11, 2021, now Pat. No. 11,725,162, which is a (Continued)

(51) Int. Cl.
*C11D 1/00* (2006.01)
*B08B 3/02* (2006.01)
(Continued)

(52) U.S. Cl.
CPC ................ *C11D 3/33* (2013.01); *B08B 3/022* (2013.01); *B08B 3/041* (2013.01); *B08B 3/08* (2013.01);
(Continued)

(58) Field of Classification Search
CPC ......... C11D 1/00; C11D 3/044; C11D 3/2086; C11D 3/33; C11D 3/0073; C11D 3/30
(Continued)

(56) References Cited

U.S. PATENT DOCUMENTS 5,078,891 A 1/1992 Sherwood et al.
5,147,555 A 9/1992 Brown et al.
(Continued)

FOREIGN PATENT DOCUMENTS

WO 0066810 A1 11/2000
WO 0194510 A1 12/2001
(Continued)

OTHER PUBLICATIONS

European Patent Office in connection with EP 18760944.1 filed Feb. 26, 2018, "Extended European Search Report" 9 pages, mailed Jan. 18, 2021.
(Continued)

*Primary Examiner* — Gregory R Delcotto
(74) *Attorney, Agent, or Firm* — McKee, Voorhees & Sease, PLC

(57) ABSTRACT

The invention relates to compositions, methods of manufacture, and methods for reducing metal corrosion during alkaline cleaning. In particular, the method employs an alkylamino hydroxy acid, secondary amine, or combination thereof in alkaline cleaning of hard surfaces.

20 Claims, 4 Drawing Sheets

Related U.S. Application Data division of application No. 15/904,880, filed on Feb. 26, 2018, now Pat. No. 11,198,837.

(60) Provisional application No. 62/464,864, filed on Feb. 28, 2017.

(51) Int. Cl.

| | |
|---|---|
| ***B08B 3/04*** | (2006.01) |
| ***B08B 3/08*** | (2006.01) |
| ***B08B 3/10*** | (2006.01) |
| ***C11D 3/00*** | (2006.01) |
| ***C11D 3/04*** | (2006.01) |
| ***C11D 3/20*** | (2006.01) |
| ***C11D 3/26*** | (2006.01) |
| ***C11D 3/30*** | (2006.01) |
| ***C11D 3/33*** | (2006.01) |

(52) U.S. Cl.
CPC .................. *B08B 3/10* (2013.01); *C11D 1/00* (2013.01); *C11D 3/0073* (2013.01); *C11D 3/044* (2013.01); *C11D 3/2086* (2013.01); *C11D 3/30* (2013.01); *C11D 2111/14* (2024.01); *C11D 2111/16* (2024.01)

(58) Field of Classification Search
USPC ....... 510/234, 235, 245, 255, 264, 272, 480, 510/499, 509
See application file for complete search history.

(56) References Cited

U.S. PATENT DOCUMENTS

| | | | | |
|---|---|---|---|---|
| 5,158,685 | A | 10/1992 | Freese | |
| 5,271,862 | A | 12/1993 | Freese | |
| 5,409,062 | A | 4/1995 | Brown et al. | |
| 5,578,246 | A | 11/1996 | Beardwood | |
| 5,800,732 | A | 9/1998 | Coughlin et al. | |
| 6,387,864 | B1 * | 5/2002 | Bartelme | C11D 3/06 510/340 |
| 6,585,933 | B1 | 7/2003 | Ehrhardt et al. | |
| 6,685,840 | B2 | 2/2004 | Hatch | |
| 7,858,574 | B2 | 12/2010 | Smith et al. | |
| 9,127,236 | B2 * | 9/2015 | Silvernail | C11D 17/0052 |
| 9,290,851 | B2 | 3/2016 | Gill et al. | |
| 9,677,031 | B2 | 6/2017 | Cabanas et al. | |
| 2010/0090158 | A1 | 4/2010 | Ishikawa et al. | |
| 2013/0062568 | A1 * | 3/2013 | Miralles | C11D 7/08 252/392 |
| 2014/0219994 | A1 | 8/2014 | Liu et al. | |
| 2014/0235521 | A1 | 8/2014 | Silvernail et al. | |
| 2014/0294759 | A1 | 10/2014 | Chu et al. | |
| 2014/0294784 | A1 | 10/2014 | Waldman et al. | |
| 2015/0099686 | A1 | 4/2015 | Silvernail et al. | |
| 2015/0322383 | A1 | 11/2015 | Ortmann et al. | |
| 2015/0345031 | A1 | 12/2015 | Gill et al. | |
| 2015/0354067 | A1 | 12/2015 | Gill et al. | |
| 2015/0361385 | A1 | 12/2015 | Pham et al. | |
| 2015/0368592 | A1 | 12/2015 | Cabanas et al. | |
| 2016/0326460 | A1 | 11/2016 | Solomon et al. | |
| 2017/0240844 | A1 | 8/2017 | Cabanas et al. | |

FOREIGN PATENT DOCUMENTS

| | | | | |
|---|---|---|---|---|
| WO | 2009087541 | A1 | 7/2009 | |
| WO | WO-2013041131 | A1 * | 3/2013 | C11D 1/02 |
| WO | WO-2013110349 | A1 * | 8/2013 | A01N 37/02 |
| WO | 2015065800 | A1 | 5/2015 | |
| WO | 2017063188 | A1 | 4/2017 | |

OTHER PUBLICATIONS

SciFinder, Task History, “Determination of rate and complex constants in copper-catalyzed hydrolysis of glycine ethyl ester”, task began Apr. 19, 2016.

SciFinder, Task History, “Synthesis of Substituted N-(benzyl or benzyloxy) glycine ethyl esters and hydrazides”, task began Apr. 19, 2016.

SciFinder, Task History, “Stereospecfic Preparation of N-alkyl- and N-aralkyl-.amino-hydroxy acids”, task began Apr. 19, 2016.

“The International Search Report and Written Opinion of the International Searching Authority” in connection to PCT/US2018/019700, filed Feb. 26, 2018 mailed May 16, 2018.

* cited by examiner

ALKALINE CLEANING COMPOSITIONS COMPRISING AN ALKYLAMINO HYDROXY ACID AND/OR SECONDARY AMINE AND METHODS OF REDUCING METAL CORROSION

CROSS-REFERENCE TO RELATED APPLICATIONS

This is a Divisional Applications of U.S. Ser. No. 17/454,577, filed Nov. 11, 2021, which is a Divisional Applications of U.S. Ser. No. 15/904,880, filed Feb. 26, 2018, now U.S. Pat. No. 11,198,837, issued Dec. 14, 2021, which application is related to and claims priority under 35 U.S.C. § 119 to U.S. Provisional Application Ser. No. 62/464,864, filed on Feb. 28, 2017 and entitled ALKALINE CLEANING COMPOSITIONS COMPRISING AN ALKYLAMINO HYDROXY ACID AND/OR SECONDARY AMINE AND METHODS OF REDUCING METAL CORROSION. The entire contents of each patent application are hereby expressly incorporated herein by reference including, without limitation, the specification, claims, and abstract, as well as any figures, tables, or drawings thereof.

This application is related to U.S. Patent Application Ser. No. 62/464,938 and U.S. patent application Ser. No. 15/904,849 (now issued U.S. Pat. No. 10,793,809) each entitled "ALKALINE CLEANING COMPOSITIONS COMPRISING A HYDROXYPHOSPHONO CARBOXYLIC ACID AND METHODS OF REDUCING METAL CORROSION." The entire contents of these are hereby expressly incorporated herein by reference including, without limitation, the specification, claims, and abstract, as well as any figures, tables, or drawings thereof.

FIELD OF THE INVENTION

The invention relates to compositions and methods for reducing metal corrosion during alkaline cleaning. In particular, the method employs a alkylamino hydroxy acid, secondary amine, or combination thereof in alkaline cleaning of hard surfaces.

BACKGROUND OF THE INVENTION

Many types of metals (e.g., aluminum and its alloys, nickel and its alloys, tin and its alloys, and some grades of stainless steel, e.g., 300 and 400 series and their alloys) corrode, discolor, and/or stain when subjected to high alkalinity. Corrosion refers to destruction, degradation or deterioration of the metal due to reactions of the material and its environment. The rate of corrosion may vary, depending on the surrounding conditions and also the composition of the steel. Stainless steel, for example, is more resistant to corrosion than plain carbon and other steels. This resistance is due to the addition of chromium to alloys of iron and carbon. Although stainless steel has appreciable resistance to corrosion, it will still corrode in certain circumstances and attempts have been made to prevent or reduce this corrosion.

Corrosion, including, discoloration, staining, and pitting can be worsened when the high alkalinity is coupled with high temperatures. This can be particularly problematic in contexts where a metal is subjected to an alkaline environment, particularly, when it is coupled with high temperatures. Thus, clean-in-place technologies, clean-out-of-place technologies, warewash, food and beverages surfaces, and boilers can suffer from this problem.

Some attempts to remedy this problem have been provided and exist. Examples include the use of corrosion inhibitors. Many metallic ion corrosion inhibitors have been used alone or in combination in various chemical treatment formulations. Some inhibitors, however, have been found to be toxic and/or detrimental to the environment. Inorganic phosphates such as orthophosphate and pyrophosphate have been widely used corrosion inhibitors. However, the inorganic phosphates have been found to contribute to scale formation (e.g., calcium phosphate, iron phosphate and zinc phosphate salts). Some organic phosphonates (e.g. 2-phosphono-butane-1,2,4-tricarboxylic acid (PBTC), 1-hydroxyethylidene-1,1-diphosphonic acid (HEDP), and aminotrimethylene-phosphonic acid (AMP)) have been used as corrosion inhibitors; however, the effectiveness has not been optimized. Some hydroxycarboxylic acids (e.g. gluconic acid) have also been used as corrosion inhibitors in aqueous applications such as cleaning cooling towers; however, there are microbiological growth control concerns and performance concerns when used in certain conditions, such as high alkalinity, temperature and/or oxidizing environments.

This is particularly problematic in the area of food processing surfaces, such as CIP and COP technologies or other food processing surfaces comprised of food grade stainless steel. For example, such surfaces are used in the manufacture of foods and beverages, where hard surfaces commonly become contaminated with soils such as carbohydrate, proteinaceous, and hardness soils, food oil soils and other soils. Food and beverage soils are particularly tenacious when they are heated during processing (e.g. in dairy plants, dairy products are heated on a pasteurizer such as a high temperature short time pasteurizer or ultra-high temperature pasteurizer). Also, many food and beverage products are concentrated or created as a result of evaporation. When that surface is a heat exchange surface, the soil becomes thermally degraded rendering it even more difficult to remove.

Surfaces cleaned in a CIP process are most often stainless steel surfaces. The cleaning requires a complete or partial shutdown of the equipment being cleaned, which results in lost production time. Many times, the equipment is not thoroughly cleaned, due to the large downtime needed. Therefore, what is needed is an improved method for cleaning this equipment, using the CIP process, which uses an alkaline cleaning composition that will prevent corrosion and damage to the stainless steel surfaces treated in order to thoroughly remove the soils. It is against this background that the present invention has been made.

Accordingly, it is an objective of the invention to develop compositions and methods for reducing metal corrosion, discoloration, and/or staining in an alkaline environment.

Another object of the invention is to develop compositions and methods for preventing metal corrosion, discoloration, and/or staining in an alkaline environment.

A further object of the invention is to reduce the metal corrosion, discoloration, and/or staining in alkaline and high temperature environments.

Still another object of the invention is to prevent the metal corrosion, discoloration, and/or staining in alkaline and high temperature environments.

Other objects, advantages and features of the present invention will become apparent from the following specification taken in conjunction with the accompanying drawings.

BRIEF SUMMARY OF THE INVENTION

An advantage of the invention is that it can reduce corrosion, staining, and/or discoloration of metals in high alkaline cleaning. It is an advantage of the present invention that that it can reduce corrosion, staining, and/or discoloration of metals in high alkaline and high temperature cleaning.

In an embodiment, the present invention comprises a method for cleaning a hard surface comprising contacting a hard surface with a cleaning composition comprising an alkylamino hydroxy acid, secondary amine, or combination thereof; diluting the cleaning composition to form an aqueous cleaning solution; rinsing the hard surface. The alkalinity source can comprise an alkali metal hydroxide and the pH of the aqueous cleaning solution can be at least about 9.

A further embodiment of the invention can be found in a method for cleaning a hard surface comprising contacting a hard surface with an aqueous cleaning solution comprising between about 0.001% (active) and about 4% (active) of an alkylamino hydroxy acid, secondary amine, or combination thereof, and between about 0.001% (active) and about 12% (active) of an alkalinity source; wherein the alkalinity source is comprises an alkali metal hydroxide; and wherein the aqueous cleaning solution has a pH of at least about 10; and rinsing the hard surface.

Another embodiment of the invention can be found in a method for cleaning a hard surface comprising contacting a hard surface with a cleaning composition comprising an alkylamino hydroxy acid, secondary amine, or combination thereof, and an alkalinity source; diluting the cleaning composition to form an aqueous cleaning solution; and rinsing the hard surface. The concentration of alkylamino hydroxy acid, secondary amine, or combination thereof in the aqueous cleaning composition can be between about 0.001% (active) and about 4% (active). The alkylamino hydroxy acid can comprise one or more 3-alkylamino-2-hydroxysuccinic acid compounds and/or salts thereof, and the secondary amine can comprise the following formula:

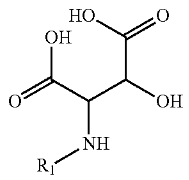

wherein $R_1$ is linear or branched having between about 1 and about 20 carbons. The alkalinity source can be in an amount between about 0.001% (active) and about 12% (active) and comprise an alkali metal hydroxide. The aqueous cleaning solution has a pH of at least about 9.

While multiple embodiments are disclosed, still other embodiments of the present invention will become apparent to those skilled in the art from the following detailed description, which shows and describes illustrative embodiments of the invention. Accordingly, the figures, detailed description, and examples are to be regarded as illustrative in nature and not restrictive.

BRIEF DESCRIPTION OF THE FIGURES

FIG. 1A shows the results after 1 week. FIG. 1B shows the results after 2 weeks. FIG. 1C shows the results after 3 weeks.

Figure 1A:
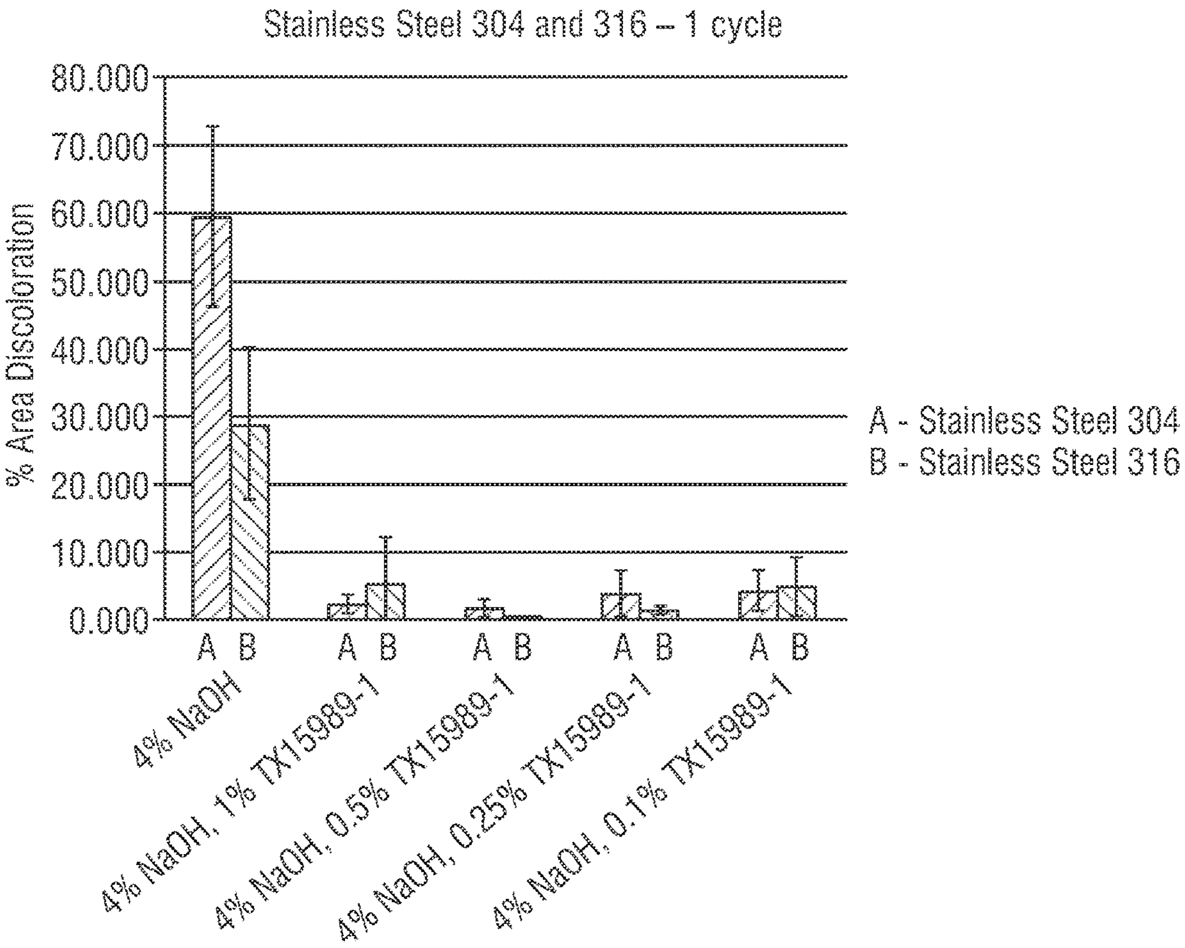
FIGS. 1A-1C show the weekly percent area of discoloration on stainless steel series 304 and 316 coupons after being subjected to 4% (active) NaOH for three weeks and the effect of the concentration of an exemplary alkylamino hydroxy acid in reducing the discoloration. The exemplary alkylamino hydroxy acid was tested in active concentrations of 0.1%, 0.25%, 0.5%, and 1%. Data series A is represents stainless steel series 304 and data series B represents stainless steel 316 series B.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

The present invention relates to compositions and methods for reducing and/or preventing the corrosion of metals in an alkaline environment. The compositions and methods of the invention have many advantages over existing compositions and methods of reducing and/or preventing corrosion of metals in an alkaline environment. For example, the present invention provides methods for using high alkalinity on stainless steel surfaces without discoloring, staining, and corroding the stainless steel to the extent that other methods do. This provides for cleaner surfaces, the ability to clean with high alkalinity, and generally more sanitary surfaces.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

Definitions

The embodiments of this invention are not limited to use alongside particular detergents, cleaning agents, or end-use of the metal surface, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range, including, but not limited to subsumed integers, decimals, and fractions (e.g. 1 to 5 includes 1, 1.5, 2, 2¾, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the term "hard surface" can include, but is not limited to, a food processing surface, warewashing surface, floor, shower, sink, and toilet.

As used herein, the term "polymer" generally includes, but is not limited to, homopolymers, copolymers, such as for example, block, graft, random and alternating copolymers, terpolymers, and higher "x" mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "solid", refers to a hardened composition that will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and particularly up to approximately 120° F.

As used herein, the term "stainless steel," refers to the classification of carbon steels containing at least about 5 weight percent, usually about 5 to about 40 weight percent, and normally about 10 to about 25 weight percent chromium. They may also contain other alloying elements such as nickel, cerium, aluminum, titanium, copper, or other elements. Stainless steels are usually classified in three different categories—austenitic, ferritic, and martensitic steels—which have in common the fact that they contain significant amounts of chromium and resist corrosion and oxidation to a greater extent than do ordinary carbon steels and most alloy steels. Additional description of the classifications (including SAE steel grades used for grading in the U.S. for stainless steel) and compositions of stainless steel, including those stainless steel having higher corrosion-resistant properties which are also suitable for use with the present application, is disclosed for example in U.S. Patent Publication No. 2013/0062568, the entire disclosure of which is herein incorporated by reference.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

As used herein, the term "sulfoperoxycarboxylic acid," "sulfonated peracid," or "sulfonated peroxycarboxylic acid" refers to the peroxycarboxylic acid form of a sulfonated carboxylic acid. In some embodiments, the sulfonated peracids of the present invention are mid-chain sulfonated peracids. As used herein, the term "mid-chain sulfonated peracid" refers to a peracid compound that includes a sulfonate group attached to a carbon that is at least one carbon (e.g., the three position or further) from the carbon of the percarboxylic acid group in the carbon backbone of the percarboxylic acid chain, wherein the at least one carbon is not in the terminal position. As used herein, the term "terminal position," refers to the carbon on the carbon backbone chain of a percarboxylic acid that is furthest from the percarboxyl group.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "warewashing surface" refers to items such as eating and cooking utensils, dishes, warewash machines, tubs, sinks, and countertops. As used herein, the term "warewashing" refers to washing, cleaning, or rinsing ware.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Compositions

The compositions of the invention can be concentrated or diluted use solution. The concentrated compositions can be in solid or liquid form. The compositions of the invention generally include an alkalinity source, an alkylamino hydroxy acid and/or secondary amine, a surfactant, water, and optional functional ingredients. The alkylamino hydroxy acid and/or secondary amine can be included in a composition with the other ingredients for an alkaline detergent composition or the alkylamino hydroxy acid and/or secondary amine can be added separately to a use solution. Similarly, the additional functional ingredients can be included in the composition with the alkalinity source, an alkylamino hydroxy acid and/or secondary amine, surfactant, and water, or the additional functional ingredients can be added separately to a use solution.

Preferably, the compositions provide a pH of between about 9.5 and about 14; more preferably between about 11 and about 13.5; and most preferably between about 12 and 13.5.

Alkalinity Source

The compositions of the invention include an alkalinity source. The alkalinity source is an alkali metal hydroxide. Exemplary alkali metal hydroxides that can be used include, but are not limited to sodium, lithium, and potassium hydroxide.

In general, alkalinity sources are commonly available in aqueous, powdered, flake, or bead form, any of which can useful in formulating the present detergent compositions. The alkalinity may be added to the composition in any form known in the art, including as solid beads, flake, granulated or particulate form, dissolved in an aqueous solution, or a combination thereof. The concentrations of alkalinity sources here are described as active amounts of alkalinity as different types of alkalinity sources and different forms of alkalinity sources often have varying active amounts.

In general, it is expected that the compositions can contain the alkalinity source in an amount between about 5% and about 99% active alkalinity by weight, between about 10% and about 50% active alkalinity by weight, and between about 35% and about 50% active alkalinity by weight of the total weight of the detergent composition. When diluted to a use solution, the compositions of the present invention can include between about 0.001% to about 12% of active alkalinity source, preferably between about 0.01% and about 10% active alkalinity, most preferably between about 0.1% and about 6% active alkalinity.

Alkylamino Hydroxy Acid and Secondary Amines

The compositions of the invention can include an alkylamino hydroxy acid and/or salt thereof, secondary amine, or combination thereof. Preferably, the compositions include 3-alkylamino-2-hydroxysuccinic acid compounds and/or salts thereof, dimethyl amine, or combination thereof.

Suitable alkylamino hydroxy acid can comprise one or more 3-alkylamino-2-hydroxysuccinic acid compounds and/or salts thereof. Illustrative, non-limiting examples of 3-alkylamino-2-hydroxysuccinic acid compounds are selected from the group consisting of 2-n-butylamino-3-hydroxysuccinic acid, 2-dimethylamino-3-hydroxysuccinic acid, 2-diethylamino-3-hydroxysuccinic acid, 2-isoamyamino-3-hydroxysuccinic acid, 2-ethylenediamino-3-hydroxysuccinic acid, 2-(2-methoxyethyl)amino-3-hydroxysuccinic acid, 2-(3-methoxypropyl)amino-3-hydroxysuccinic acid, 2-sec-butylamino-3-hydroxysuccinic acid, 2-dimethylamino-N-oxide-3-hydroxysuccinic acid, salts of the foregoing, and any combination thereof. The compositions and methods may comprise any one of these 3-alkylamino-2-hydroxysuccinic acid compounds or it may comprise a mixture of any two or more of these 3-alkylamino-2-hydroxysuccinic acid compounds. These compounds are more extensively discussed, including, methods of their preparation in U.S. Pat. No. 9,290,851 at col. 2, line 45 through col. 13, line 59, which is incorporated herein by reference in the entirety of the cited columns and line numbers.

Suitable secondary amines can comprise amines of the formula below:

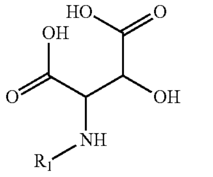

wherein $R_1$ is linear or branched having a carbon chain length of between about 1 and about 20 carbons. Preferably, R1 is an alkyl group having a chain length of between about 1 and about 10 carbons.

The compositions of the invention can be difficult to formulate in concentrated form due to instability of the alkylamino hydroxy acid and secondary amine in the highly alkaline composition. While not wishing to be bound by the theory, it is believed that the alkylamino hydroxy acid and secondary amine may not be stable in a highly alkaline formulation. Thus, for applications where the alkalinity desired is particularly high, i.e., greater than pH 10 it may be preferable to keep the alkylamino hydroxy acid and/or secondary amine can be in a separate composition from the alkalinity source until preparation of a use solution. Such a composition is a multi-part system. In embodiments of the invention containing an oxidizer, the oxidizer is also kept in a separate part from the alkalinity source. Thus, in some embodiments the composition can be a two-part system or a three-part system.

In concentrated compositions where the aqueous use solution is not greater than 10, the composition can be kept in a pre-mix composition, where all the components, except the water of dilution and optional oxidizer, are kept in a single composition. In such a composition, the oxidizer can be added immediately before use or simultaneously to a hard surface at the time of use.

In general, it is expected that the concentrated compositions can contain the alkylamino hydroxy acid and/or secondary amine in an amount between about 0.01 wt. % and about 40 wt. %, preferably between about 0.25 wt. % and about 20 wt. %, and more preferably between about 0.5 wt. % and about 10 wt. % of the concentrated composition.

In use solution, the compositions of the present invention can include the alkylamino hydroxy acid and/or secondary amine in an between about 0.001 wt. % and about 4 wt. %, preferably between about 0.01 wt. % and about 2 wt. %, more preferably between about 0.01 wt. % and about 1 wt. %.

Surfactants

The compositions of the invention can include a surfactant. Surfactants suitable for use with the compositions of the present invention include, but are not limited to, nonionic surfactants, cationic surfactants, anionics, and zwitterionic surfactants. In embodiments of the invention the compositions and methods can be substantially free of anionic and other high foaming surfactants. In other embodiments of the invention, anionic surfactants and other high foaming surfactants can be included with a defoamer.

The concentrated compositions of the present invention can contain between about 0 wt. % and about 50 wt. % of a surfactant, preferably between about 0 wt. % and about 25 wt. %, and more preferably between about 0 wt. % and about 10 wt. %. The use solution compositions, can contain between about 0 ppm to about 1000 ppm of a surfactant, preferably between about 0 ppm and about 500 ppm of a surfactant, more preferably between about 0 ppm of a surfactant and about 100 ppm of a surfactant.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names IGEPAL® manufactured by Rhone-Poulenc and TRITON® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names LUTENSOL™, DEHYDOL™ manufactured by BASF, NEODOL™ manufactured by Shell Chemical Co. and ALFONIC™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names DISPONIL or AGNIQUE manufactured by BASF and LIPOPEG™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse PLURONICS™ are manufactured by BASF Corporation under the trade name PLURONIC™ R surfactants. Likewise, the TETRONIC™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

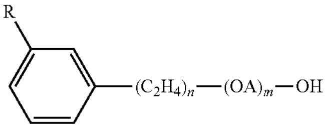

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $-(C_2H_4O)_XH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_SN$-$(EO)_tH$, $R^{20}$—$(PO)_SN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes SURFONIC™ PEA 25 Amine Alkoxylate. Preferred nonionic surfactants for the compositions of the invention include alcohol alkoxylates, EO/PO block copolymers, alkylphenol alkoxylates, and the like.

14. A polyalkylene oxide-modified polydimethylsiloxane, nonionic surfactant or a polybetaine-modified polysiloxane amphoteric surfactant can be employed as a nonionic surfactant. Both, in some embodiments, are linear polysiloxane copolymers to which polyethers or polybetaines have been grafted through a hydrosilation reaction. Some examples of specific siloxane surfactants are known as SILWET® surfactants available from Union Carbide, ABIL® polyether or polybetaine polysiloxane copolymers available from Evonik Corporation, Tegopren® polyether polysiloxane copolymers available from Evonik Corporation and others described in U.S. Pat. No. 4,654,161 which is incorporated herein by reference.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

15. Amine oxides are tertiary amine oxides corresponding to the general formula:

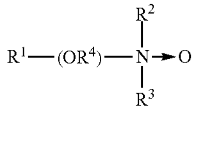

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

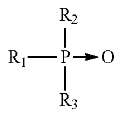

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide. Semi-polar nonionic surfactants useful herein also include the water soluble sulfoxide compounds which have the structure:

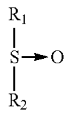

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 ($R-(EO)_5(PO)_4$) and Dehypon LS-36 ($R-(EO)_3(PO)_6$); and capped alcohol alkoxylates, such as Plurafac LF221 and Tegoten EC11; mixtures thereof, or the like.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

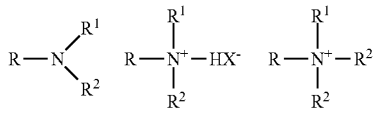

in which, R represents an alkyl chain, R', R'', and R''' may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_m R^2_x Y_L Z$ wherein each $R^1$ is an organic group containing a straight or branched alkyl or alkenyl group optionally substituted with up to three phenyl or hydroxy groups and optionally interrupted by up to four of the following structures:

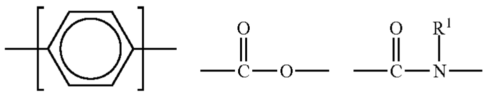

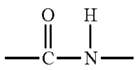

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y can be a group including, but not limited to:

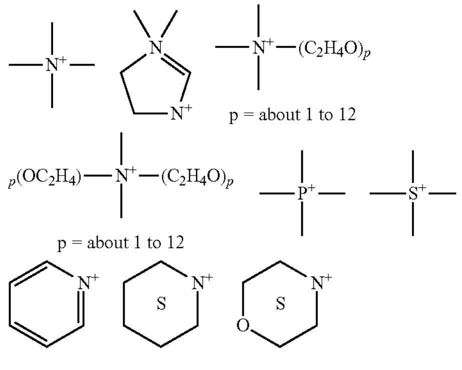

p = about 1 to 12 p = about 1 to 12 or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

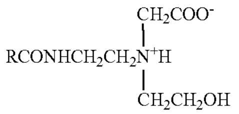

(MONO)ACETATE

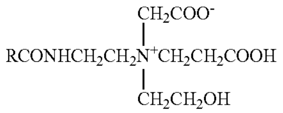

(DI)PROPIONATE

Neutral pH Zwitternion

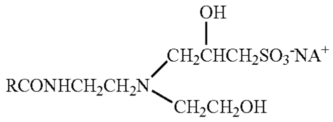

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R=$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the trade name MIRANOL™ FBS from Rhodia Inc., Cranbury, N.J. Another suitable coconut derived amphoteric surfactant with the chemical name disodium cocoampho diacetate is sold under the trade name MIRATAINE™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

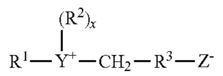

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]- butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

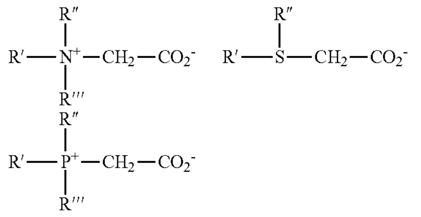

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Water

The compositions include water. Water can be included in the solid compositions as water of hydration for a hydratable salt formulation. Those of skill in the art will be capable of selecting the grade of water desired with the desired level of water hardness and grain. When water is included in the compositions of the present invention, it can comprise between about 0 wt. % and about 80 wt. %, preferably between about 0.01 wt. % and about 75 wt. %, more preferably between about 1 wt. % and about 50 wt. %. In a use solution, the majority of the solution will comprise water, preferably greater than 90 wt. %, more preferably greater than 95 wt. %, and most preferably 99 wt. % or greater.

Additional Functional Ingredients

The components of the compositions can further be combined with various functional components. In some embodiments, the composition including the alkalinity source, an alkylamino hydroxy acid and/or secondary amine, surfactant, and water make up a large amount, or even substantially all of the total weight of the composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically CIP and ware wash applications. However, other embodiments may include functional ingredients for use in other applications.

In some embodiments, the compositions may include an anionic surfactant, an anti-redeposition agent, a bleaching agent, a carbonate, a chelant, a defoaming agent, a dispersant, a dye, a fragrance, a hydrotrope, an oxidizing agent, and/or a stain inhibitor.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

Generally, anionics have high foam profiles which may limit applications of use for cleaning systems such as CIP circuits that require strict foam control. However, other applications of use, including high foaming applications are suitable for using anionic surface active compounds to impart special chemical or physical properties. The majority of large volume commercial anionic surfactants can be subdivided into five major chemical classes and additional sub-groups known to those of skill in the art and described in "Surfactant Encyclopedia," *Cosmetics & Toiletries*, Vol. 104 (2) 71-86 (1989). The first class includes acylamino acids (and salts), such as acylglutamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Anionic sulfonate surfactants suitable for use in the present compositions include alkyl sulfonates, the linear and branched primary and secondary alkyl sulfonates, and the aromatic sulfonates with or without substituents. Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). Particularly suitable anionic sulfonates include alkyldiphenyloxide disulfonates, including for example C6 alkylated diphenyl oxide disulfonic acid, commercially-available under the trade name DOWFAX®.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylglutamates, acyl peptides, sarcosinates (e.g. N-acyl sarcosinates), taurates (e.g. N-acyl taurates and fatty acid amides of methyl tauride), and the like.

Suitable anionic carboxylate surfactants may further include polycarboxylates or related copolymers. A variety of such polycarboxylate polymers and copolymers are known and described in patent and other literature, and are available commercially. Exemplary polycarboxylates that may be utilized according to the invention include for example: homopolymers and copolymers of polyacrylates; polymethacrylates; polymalates; materials such as acrylic, olefinic and/or maleic polymers and/or copolymers. Various examples of commercially-available agents, namely acrylic-maleic acid copolymers include, for example: Acusol 445N and Acusol 448 (available from Dow Chemical. Examples of suitable acrylic-maleic acid copolymers include, but are not limited to, acrylic-maleic acid copolymers having a molecular weight of between about 1,000 to about 100,000 g/mol, particularly between about 1,000 and about 75,000 g/mol and more particularly between about 1,000 and about 50,000 g/mol.

Suitable anionic surfactants include alkyl or alkylaryl ethoxy carboxylates of the following formula:

$$R—O—(CH_2CH_2O)(CH_2)_m—CO_2X$$

in which R is a $C_8$ to $C_{22}$ alkyl group or

INCLUDEPICTURE

"https://patentimages.storage.googleapis.com/US20140235521A1/US20140235521A 1-20140821-C00006.png"*MERGEFORMATINET INCLUDEPICTURE "https://patentimages.storage.googleapis.com/US20140235521A1/US20140235521A 1-20140821-C00006.png"*MERGEFORMATINET INCLUDEPICTURE "https://patentimages.storage.googleapis.com/US20140235521A1/US20140235521A 1-20140821-C00006.png"*MERGEFORMATINET INCLUDEPICTURE "https://patentimages.storage.googleapis.com/US20140235521A1/US20140235521A 1-20140821-C00006.png"*MERGEFORMATINET in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_5$-$C_{16}$ alkyl group. In some embodiments, R is a $C_{12}$-$C_{14}$ alkyl group, n is 4, and m is 1.

In other embodiments, R is

INCLUDEPICTURE

"https://patentimages.storage.googleapis.com/US20140235521A1/US20140235521A 1-20140821-C00007.png"*MERGEFORMATINET INCLUDEPICTURE "https://patentimages.storage.googleapis.com/US20140235521A1/US20140235521A 1-20140821-$C_{00007}$.png"*MERGEFORMATINET INCLUDEPICTURE "https://patentimages.storage.googleapis.com/US20140235521A1/US20140235521A 1-20140821-C00007.png"*MERGEFORMATINET INCLUDEPICTURE "https://patentimages.storage.googleapis.com/US20140235521A1/US20140235521A 1-20140821-C00007.png"*MERGEFORMATINET and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 234, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product SANDOPAN® DTC, a $C_{13}$ alkyl polyethoxy (7) carboxylic acid.

Anti-Redeposition Agents

The compositions can optionally include an anti-redeposition agent capable of facilitating sustained suspension of soils in a cleaning solution and preventing the removed soils from being redeposited onto the surface being cleaned. Examples of suitable anti-redeposition agents include, but are not limited to: fatty acid amides, fluorocarbon surfactants, complex phosphate esters, polyacrylates, styrene maleic anhydride copolymers, and cellulosic derivatives such as hydroxyethyl cellulose, hydroxypropyl cellulose.

Bleaching Agents

Suitable bleaches for use in the compositions and methods of the invention can be halogen-based bleaches or oxygen-based bleaches.

A halogen-based bleach may be effectively used as ingredient of the first component. In that case, said bleach is desirably present at a concentration (as active halogen) in the range of from 0 to 10%, preferably from 0.5 to 8%, more preferably from 1 to 6%, by weight. As halogen bleach, alkali metal hypochlorite may be used. Other suitable halogen bleaches are alkali metal salts of di- and tri-chloro and di- and tri-bromo cyanuric acids.

Suitable oxygen-based bleaches are the peroxygen bleaches, such as sodium perborate (tetra- or monohydrate), sodium percarbonate, hydrogen peroxide, and peracids. These are preferably used in conjunction with a bleach activator which allows the liberation of active oxygen species at a lower temperature. Numerous examples of activators of this type, often also referred to as bleach precursors, are known in the art and amply described in the literature such as U.S. Pat. Nos. 3,332,882 and 4,128,494 herein incorporated by reference. Preferred bleach activators are tetraacetyl ethylenediamine (TAED), sodium nonanoyloxybenzene sulphonate (SNOBS), glucose pentaacetate (GPA), tetraacetylmethylene diamine (TAMD), triacetyl cyanurate, sodium sulphonyl ethyl carbonic acid ester, sodium acetyloxybenzene and the mono long-chain acyl tetraacetyl glucoses as disclosed in WO 1991/10719, but other activators, such as choline sulphophenyl carbonate (CSPC), as disclosed in U.S. Pat. Nos. 4,751,015 and 4,818,426 can also be used. Preferred peroxygen bleach precursors are sodium p-benzoyloxy-benzene sulfonate, N,N,N,N-tetraacetyl ethylenediamine (TEAD), sodium nonanoyloxybenzene sulfonate (SNOBS) and choline sulfophenyl carbonate (CSPC).

Peracids suitable for the invention can be a single species or mixture. Suitable peracids can be selected based on the desired end use and based upon compatibility with other components in the compositions and methods. Preferred peracids include those having a carbon chain length of C2 to C12. Suitable peracids can include those described in U.S. Pat. No. 8,846,107, entitled, "In Situ Generation of Peroxycarboxylic Acids at Alkaline pH, and Methods of Use Thereof," which is expressly incorporated herein in its entirety by reference, including without limitation all drawings and chemical structures contained therein. Suitable peracids can include alkyl ester peroxycarboxylic acids, ester peroxycarboxylic acids, sulfoperoxycarboxylic acids, and others. Suitable alkyl ester peroxycarboxylic acids and ester peroxycarboxylic acids can include those described in U.S. Pat. Nos. 7,816,555 and 7,622,606, both entitled "Peroxycarboxylic Acid Compositions with Reduced Odor," hereby expressly incorporated herein in its entirety by reference, including without limitation all drawings and chemical structures contained therein. Suitable sulfoperoxycarboxylic acids can include those described in U.S. Pat. No. 8,809,392, entitled, "Sulfoperoxycarboxylic Acids, Their Preparation and Methods of Use as Bleaching and Antimicrobial Agents," which is expressly incorporated herein in its entirety by reference, including without limitation all drawings and chemical structures contained therein.

Peroxybenzoic acid precursors are known in the art as described in GB-A-836,988, herein incorporated by reference. Examples of suitable precursors are phenylbenzoate, phenyl p-nitrobenzoate, o-nitrophenyl benzoate, o-carboxyphenyl benzoate, pbromophenyl benzoate, sodium or potassium benzoyloxy benzene sulfonate and benzoic anhydride.

Halogen bleaching agents be present in the compositions and methods of the invention in an amount between about 0 ppm and about 1000 ppm. Peracid bleaching agents can be present in the compositions and methods of the invention in an amount between about 0 ppm and about 2500 ppm. Other peroxygen-based bleaching agents (e.g., peroxide, percarbonate, and perborate) can be present in the compositions and methods of the invention in an amount between about 0 ppm and about 15,000 ppm.

Carbonate

The compositions and methods of the invention can optionally include a carbonate as a secondary alkalinity source and/or hardening agent. Suitable carbonates include alkali metal carbonates, such as sodium carbonate, potassium carbonate, bicarbonate, sesquicarbonate, and mixtures thereof. When employed as a hardening agent, the carbonate can further comprise water of hydration sufficient to solidify the carbonate. The optional carbonate can be present in the inventions in an amount between about 0.1 wt. % and about 50 wt. %.

Chelant

The compositions can optionally include a chelant for water conditioning/sequestering properties. Suitable chelants can include amino carboxylates, amino phosphonates, polyfunctionally-substituted aromatic chelating agents, hydroxycarboxylic acids and mixtures thereof. Preferred chelants for use herein are ethylenediamine tetraacetic acid (EDTA), diethylenetriamine pentaacetic acid (DTPA), gluconate, citrate, tartrate, and derivatives and/or phosphonate-based chelants preferably diethylenetriamine penta methylphosphonic acid.

Other chelants include amino carboxylates include ethylenediaminetetra-acetates, N-hydroxyethylethylenediamin-etriacetates, nitrilo-triacetates, ethylenediamine tetrapro-prionates, triethylenetetraaminehexacetates, diethylenetriaminepentaacetates, and ethanoldi-glycines, alkali metal, ammonium, and substituted ammonium salts therein and mixtures therein. As well as MGDA (methylglycine-diacetic acid), and salts and derivatives thereof and GLDA (glutamic-N,N-diacetic acid) and salts and derivatives thereof. GLDA (salts and derivatives thereof) is especially preferred according to the invention, with the tetrasodium salt thereof being especially preferred.

Other suitable chelants include amino acid based compound or a succinate based compound. The term "succinate based compound" and "succinic acid based compound" are used interchangeably herein. Other suitable chelants are described in U.S. Pat. No. 6,426,229. Particular suitable chelants include; for example, aspartic acid-N-monoacetic acid (ASMA), aspartic acid-N,N-diacetic acid (ASDA), aspartic acid-N-monopropionic acid (ASMP), iminodisuccinic acid (IDS), Imino diacetic acid (IDA), N-(2-sulfomethyl)aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), β-alanine-N,N-diacetic acid-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA) and alkali metal salts or ammonium salts thereof. Also suitable is ethylenediamine disuccinate ("EDDS"), especially the [S,S] isomer as described in U.S. Pat. No. 4,704,233. Furthermore, Hydroxyethyleneiminodiacetic acid, Hydroxyiminodisuccinic acid, Hydroxyethylene diaminetriacetic acid is also suitable.

Other chelants include homopolymers and copolymers of polycarboxylic acids and their partially or completely neutralized salts, monomeric polycarboxylic acids and hydroxycarboxylic acids and their salts. Preferred salts of the abovementioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least two carboxyl groups which are in each case separated from one another by, preferably, no more than two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Preferred are the polycarboxylates end capped with sulfonates.

Amino phosphonates are also suitable for use as chelating agents and include ethylenediaminetetrakis(methylenephosphonates) as DEQUEST. Preferred, these amino phosphonates that do not contain alkyl or alkenyl groups with more than about 6 carbon atoms.

Polyfunctionally-substituted aromatic chelating agents are also useful in the compositions herein such as described in U.S. Pat. No. 3,812,044. Preferred compounds of this type in acid form are dihydroxydisulfobenzenes such as 1,2-dihydroxy-3,5-disulfobenzene.

Further suitable polycarboxylates chelants for use herein include citric acid, and succinic acid all preferably in the form of a water-soluble salt. Other suitable polycarboxylates are oxodisuccinates, carboxymethyloxysuccinate and mixtures of tartrate monosuccinic and tartrate disuccinic acid such as described in U.S. Pat. No. 4,663,071.

Defoaming Agent

The compositions and methods of the invention can optionally include a defoaming agent. Defoaming agents can be particularly suitable for embodiments of the invention including foaming surfactants, such as anionic surfactants. Generally, defoamers which can be used in accordance with the invention include silica and silicones; aliphatic acids or esters; alcohols; sulfates or sulfonates; amines or amides; halogenated compounds such as fluorochlorohydrocarbons; vegetable oils, waxes, mineral oils as well as their sulfonated or sulfated derivatives; fatty acids and/or their soaps such as alkali, alkaline earth metal soaps; and phosphates and phosphate esters such as alkyl and alkaline diphosphates, and tributyl phosphates among others; and mixtures thereof.

In some embodiments, the compositions of the present invention can include antifoaming agents or defoamers which are of food grade quality given the application of the method of the invention. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. Commercial defoamers commonly available include silicones such as ARDEFOAM™ from Armour Industrial Chemical Company which is a silicone bound in an organic emulsion; FOAM KILL™ or KRESSEO™ available from Krusable Chemical Company which are silicone and non-silicone type defoamers as well as silicone esters; and ANTI-FOAM A™ and DC-200 from Dow Corning Corporation which are both food grade type silicones among others.

In some embodiments, the compositions of the present invention can include antifoaming agents or defoaming agents which are based on alcohol alkoxylates that are stable in acid environments and are oxidatively stable. To this end one of the more effective antifoaming agents are the alcohol alkoxylates having an alcohol chain length of about C8-12, and more specifically C9-11, and having poly-propylene oxide alkoxylate in whole or part of the alkylene oxide portion. Commercial defoamers commonly available of this type include alkoxylates such as the BASF DEGRESSAL products, especially DEGRESSAL SD20.

Dispersants

The compositions can optionally include a dispersant. Examples of suitable dispersants that can be used in the solid detergent composition include, but are not limited to: maleic acid/olefin copolymers, polyacrylic acid, and mixtures thereof.

Dyes and Fragrances

The compositions can optionally include a dyes, fragrances including perfumes, and/or other aesthetic enhancing agent. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Aniline and Chemical), Metanil Yellow (Keystone Aniline and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), Pylakor Acid Bright Red (Pylam), and the like. Fragrances or perfumes that may be included in the compositions include, for example, terpenoids such as citronellol, aldehydes such as amyl cinnamaldehyde, a jasmine such as C1S-jasmine or jasmal, vanillin, and the like.

Functional Polydimethylsiloxanes

The composition can also optionally include one or more functional polydimethylsiloxanes. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET™ surfactants available from Union Carbide or ABIL™ polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters. In some embodiments, the compositions do not include a fluorochemical surfactant.

Further description of such functional polydimethylsiloxanes and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provide excellent rinse aids on plasticware. We have also found that the combination of certain silicone polysiloxane copolymers and fluorocarbon surfactants with conventional hydrocarbon surfactants also provide excellent rinse aids on plasticware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in the rinse aids to provide the same results.

Embodiments can optionally include a functional polydimethylsiloxanes in an amount in the range of up to about 10 wt-%. For example, some embodiments may include in the range of about 0.01 to 10 wt-% of a polydimethylsiloxane.

Hydrotrope

A hydrotrope component can be used to help stabilize the surfactant component. It should be understood that the hydrotrope component is optional and can be omitted if it is not needed for stabilizing the surfactant component. In many cases, it is expected that the hydrotrope component will be present to help stabilize the surfactant component. Examples of the hydrotropes include the sodium, potassium, ammonium and alkanol ammonium salts of xylene sulfonate, toluene sulfonate, ethylbenzoate sulfonate, isopropylbenzene, sulfonate naphthalene sulfonate, alkyl naphthalene sulfonates, phosphate esters of alkoxylated alkyl phenols, phosphate esters of alkoxylated alcohols, short chain (C8 or less) alkyl polyglycoside, sodium, potassium and ammonium salts of the alkyl sarcosinates, salts of cumene sulfonates, amino propionates, diphenyl oxide sulfonates, and disulfonates. The hydrotropes are useful in maintaining the organic materials including the surfactant readily dispersed in the aqueous cleaning solution and, in particular, in an aqueous concentrate which is an especially preferred form of packaging the compositions of the invention and allow the user of the compositions to accurately provide the desired amount of detergent composition.

Oxidizing Agent

An oxidizing agent can optionally added to the use solution of the invention. For stability purposes the oxidizing agent is typically added separately during performance of the method or is part of a multi-part system. This is because the oxidizer is incompatible with the alkalinity source. Suitable oxidizing agents, include peroxycarboxylic acids, hydrogen peroxide, and combinations thereof. Historically it has been difficult to incorporate oxidizers into cleaning methods for food grade stainless steel or other food processing surfaces comprised of corrodible metals as the oxidizer can dramatically increase corrosion of the surface. It is an advantage of the present invention that methods for cleaning such surfaces can be accomplished including the use of an oxidizing agent where the corrosion, discoloration, staining, and/or pitting of the surface is reduced or even prevented.

In a preferred aspect, an oxidizing agent or an oxidizer may be a peroxide or peroxyacid. Peroxygen compounds, which include peroxides and various percarboxylic acids, including percarbonates, are suitable. In such an aspect, the catalyst of the cleaning composition promotes the decomposition of the oxidizing agent providing enhanced soil removal without having the expected staining and/or corrosion of the highly oxidizing conditions. In an aspect, the oxidizing agents (e.g. oxygen compounds) react with the soil, especially when combined with an alkaline source from the cleaning composition and creates vigorous mechanical action on and within the soil, which enhances removal of the soil beyond that caused by the chemical and bleaching action.

In the methods of the invention, the oxidizing agent can be added to provide a concentration in a use solution from about 50 ppm to about 5000 ppm, from about 100 to about 3000 ppm, or from about 500 ppm to about 2500 ppm.

Peroxycarboxylic Acids

Peroxycarboxylic acid (i.e. peracid) are typically included in cleaning applications for antimicrobial and/or sanitizing efficacy. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. The terms "sulfoperoxycarboxylic acid," "sulfonated peracid," or "sulfonated peroxycarboxylic acid" refers to the peroxycarboxylic acid form of a sulfonated carboxylic acid as disclosed in U.S. Pat. No. 8,344,026, and U.S. Patent Publication Nos. 2010/0048730 and 2012/0052134, each of which are incorporated herein by reference in their entirety. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peracid includes any compound of the formula $R—(COOOH)_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Preferably, a straight or branched saturated aliphatic hydrocarbon chain having from 1 to 22 carbon atoms, such as, for example, methyl, ethyl, propyl, isopropyl (1-methylethyl), butyl, tert-butyl (1,1-dimethylethyl), and the like.

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

The term "alkenyl" includes an unsaturated aliphatic hydrocarbon chain having from 2 to 12 carbon atoms, such as, for example, ethenyl, 1-propenyl, 2-propenyl, 1-butenyl, 2-methyl-1-propenyl, and the like. The alkyl or alkenyl can be terminally substituted with a heteroatom, such as, for example, a nitrogen, sulfur, or oxygen atom, forming an aminoalkyl, oxyalkyl, or thioalkyl, for example, aminomethyl, thioethyl, oxypropyl, and the like. Similarly, the above alkyl or alkenyl can be interrupted in the chain by a heteroatom forming an alkylaminoalkyl, alkylthioalkyl, or alkoxyalkyl, for example, methylaminoethyl, ethylthiopropyl, methoxymethyl, and the like.

Further, as used herein the term "alicyclic" includes any cyclic hydrocarbyl containing from 3 to 8 carbon atoms. Examples of suitable alicyclic groups include cyclopropanyl, cyclobutanyl, cyclopentanyl, etc. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan. Additional examples of suitable heterocyclic groups include groups derived from tetrahydrofurans, furans, thiophenes, pyrrolidines, piperidines, pyridines, pyrrols, picoline, coumaline, etc.

According to the invention, alkyl, alkenyl, alicyclic groups, and heterocyclic groups can be unsubstituted or substituted by, for example, aryl, heteroaryl, $C_{1-4}$ alkyl, $C_{1-4}$ alkenyl, $C_{1-4}$ alkoxy, amino, carboxy, halo, nitro, cyano, —$SO_3H$, phosphono, or hydroxy. When alkyl, alkenyl, alicyclic group, or heterocyclic group is substituted, preferably the substitution is $C_{1-4}$ alkyl, halo, nitro, amido, hydroxy, carboxy, sulpho, or phosphono. In one embodiment, R includes alkyl substituted with hydroxy. The term "aryl" includes aromatic hydrocarbyl, including fused aromatic rings, such as, for example, phenyl and naphthyl. The term "heteroaryl" includes heterocyclic aromatic derivatives having at least one heteroatom such as, for example, nitrogen, oxygen, phosphorus, or sulfur, and includes, for example, furyl, pyrrolyl, thienyl, oxazolyl, pyridyl, imidazolyl, thiazolyl, isoxazolyl, pyrazolyl, isothiazolyl, etc. The term "heteroaryl" also includes fused rings in which at least one ring is aromatic, such as, for example, indolyl, purinyl, benzofuryl, etc.

According to the invention, aryl and heteroaryl groups can be unsubstituted or substituted on the ring by, for example, aryl, heteroaryl, alkyl, alkenyl, alkoxy, amino, carboxy, halo, nitro, cyano, —$SO_3H$, phosphono, or hydroxy. When aryl, aralkyl, or heteroaryl is substituted, preferably the substitution is $C_{1-4}$ alkyl, halo, nitro, amido, hydroxy, carboxy, sulpho, or phosphono. In one embodiment, R includes aryl substituted with $C_{1-4}$ alkyl.

Typical peroxygen compounds suitable for use as oxidizing agents include hydrogen peroxide ($H_2O_2$), peracetic acid, peroctanoic acid, a persulphate, a perborate, or a percarbonate. Some peroxycarboxylic acids include peroxypentanoic, peroxyhexanoic, peroxyheptanoic, peroxyoctanoic, peroxynonanoic, peroxyisononanoic, peroxydecanoic, peroxyundecanoic, peroxydodecanoic, peroxyascorbic, peroxyadipic, peroxycitric, peroxypimelic, or peroxysuberic acid, mixtures thereof, or the like. Some suitable branched chain peroxycarboxylic acid include peroxyisopentanoic, peroxyisononanoic, peroxyisohexanoic, peroxyisoheptanoic, peroxyisooctanoic, peroxyisonananoic, peroxyisodecanoic, peroxyisoundecanoic, peroxyisododecanoic, peroxyneopentanoic, peroxyneohexanoic, peroxyneoheptanoic, peroxyneooctanoic, peroxyneononanoic, peroxyneodecanoic, peroxyneoundecanoic, peroxyneododecanoic, mixtures thereof, or the like.

In another embodiment, a sulfoperoxycarboxylic acid has the following formula:

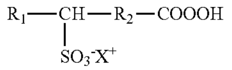

wherein $R_1$ is hydrogen, or a substituted or unsubstituted alkyl group; $R_2$ is a substituted or unsubstituted alkylene group; X is hydrogen, a cationic group, or an ester forming moiety; or salts or esters thereof. In some embodiments, $R_1$ is a substituted or unsubstituted $C_m$ alkyl group; X is hydrogen a cationic group, or an ester forming moiety; $R_2$ is a substituted or unsubstituted C alkyl group; m=1 to 10; n=1 to 10; and m+n is less than 18, or salts, esters or mixtures thereof.

In some embodiments, $R_1$ is hydrogen. In other embodiments, $R_1$ is a substituted or unsubstituted alkyl group. In some embodiments, $R_1$ is a substituted or unsubstituted alkyl group that does not include a cyclic alkyl group. In some embodiments, $R_1$ is a substituted alkyl group. In some embodiments, $R_1$ is an unsubstituted $C_1$-$C_9$ alkyl group. In some embodiments, $R_1$ is an unsubstituted $C_7$ or $C_8$ alkyl. In other embodiments, $R_1$ is a substituted $C_8$-$C_{10}$ alkylene group. In some embodiments, $R_1$ is a substituted $C_8$-$C_{10}$ alkyl group is substituted with at least 1, or at least 2 hydroxyl groups. In still yet other embodiments, $R_1$ is a substituted $C_1$-$C_9$ alkyl group. In some embodiments, $R_1$ is a substituted $C_1$-$C_9$ substituted alkyl group is substituted with at least 1 $SO_3H$ group. In other embodiments, $R_1$ is a $C_9$-$C_{10}$ substituted alkyl group. In some embodiments, $R_1$ is a substituted $C_9$-$C_{10}$ alkyl group wherein at least two of the carbons on the carbon backbone form a heterocyclic group. In some embodiments, the heterocyclic group is an epoxide group.

In some embodiments, $R_2$ is a substituted $C_1$-$C_{10}$ alkylene group. In some embodiments, $R_2$ is a substituted $C_8$-$C_{10}$ alkylene. In some embodiments, $R_2$ is an unsubstituted $C_6$-$C_9$ alkylene. In other embodiments, $R_2$ is a $C_8$-$C_{10}$ alkylene group substituted with at least one hydroxyl group. In some embodiments, $R_2$ is a $C_{10}$ alkylene group substituted with at least two hydroxyl groups. In other embodiments, $R_2$ is a $C_8$ alkylene group substituted with at least one $SO_3H$ group. In some embodiments, $R_2$ is a substituted $C_9$ group, wherein at least two of the carbons on the carbon backbone form a heterocyclic group. In some embodiments, the heterocyclic group is an epoxide group. In some embodiments, $R_1$ is a $C_8$-$C_9$ substituted or unsubstituted alkyl, and $R_2$ is a $C_7$-$C_8$ substituted or unsubstituted alkylene.

These and other suitable sulfoperoxycarboxylic acid compounds for use in the stabilized peroxycarboxylic acid compositions of the invention are further disclosed in U.S. Pat. No. 8,344,026 and U.S. Patent Publication Nos. 2010/0048730 and 2012/0052134, which are incorporated herein by reference in its entirety.

The peroxycarboxylic can be used at any suitable concentration in the oxidizing agent and/or methods of the invention.

Hydrogen Peroxide

In a preferred aspect, an oxidizing agent or an oxidizer can comprise hydrogen peroxide. Hydrogen peroxide, $H_2O_2$, provides the advantages of having a high ratio of active oxygen because of its low molecular weight (34.014 g/mole) and being compatible with numerous substances that can be treated by methods of the invention because it is a weakly acidic, clear, and colorless liquid. Another advantage of hydrogen peroxide is that it decomposes into water and oxygen. It is advantageous to have these decomposition products because they are generally compatible with substances being treated. For example, the decomposition products are generally compatible with metallic substance (e.g., substantially noncorrosive) and are generally innocuous to incidental contact and are environmentally friendly.

The hydrogen peroxide can be used at any suitable concentration in the oxidizing agent and/or methods of the invention.

Oxidizing Boosters

Suitable oxidants can also be provided in the form of a booster, which may include for example oxidants such as chlorites, bromine, bromates, bromine monochloride, iodine, iodine monochloride, iodates, permanganates, nitrates, nitric acid, borates, perborates, and gaseous oxidants such as ozone, oxygen, chlorine dioxide, chlorine, sulfur dioxide and derivatives thereof. In an aspect, such oxidants may be employed as a booster, alone or in combination with the oxidizing agent, such as a chlorine booster. Beneficially, the alkaline cleaning compositions according to the invention do not interfere with the stability of chlorine and/or other boosters.

An oxidizer may include bleaching compounds capable of liberating an active halogen species, such as $Cl_2$, $Br_2\cdot$, —OCl and/or —OBr·, under conditions typically encountered during the cleansing process. Suitable bleaching agents for use in the present detergent compositions include, for example, chlorine-containing compounds such as a chlorine, a hypochlorite (e.g. sodium hypochlorite), and/or chloramine. Preferred halogen-releasing compounds include the alkali metal dichloroisocyanurates, such as sodium dichloroisocyanurate, chlorinated trisodium phosphate, the alkali metal hypochlorites, monochlorarrine and dichloramine, and the like.

Stain Inhibitor

The compositions can optionally include a stain inhibitor. Suitable stain inhibitors include a gluconic acid or other polyhydroxy carboxylic acid (or hydroxycarboxylic acid) or salts thereof. A combination of gluconic acid and other polyhydroxy carboxylic acid (or hydroxycarboxylic acid) or salts thereof can be employed as a stain inhibitor. In an aspect, gluconic acid and glucaric acid are suitable for use as a stain inhibitor for the cleaning compositions and methods of the present invention. Preferably, the stain inhibitor is soluble in water. In embodiments of the invention, is preferred that the stain inhibitor is non- or low-foaming.

Polyhydroxy carboxylic acids or hydroxycarboxylic acids useful as stain inhibitors preferably include those having 10 or fewer carbon atoms, or from 4 to 10 carbon atoms, with similar location of the carbon atoms and similar polyol grouping. These may include for example, glycolic acid, citric acid, malic acid, tartaric acid, lactic acid, tartronic acid, glutaric acid, adipic acid and/or succinic acid.

In a preferred aspect, gluconic acid or salts thereof are employed as the stain inhibitor. In an additional aspect, glucaric acid or salts thereof are employed as the stain inhibitor. In an aspect, gluconic acid and glucaric acid are suitable for use as a stain inhibitor package for the compositions according to the invention. Gluconic acid/sodium gluconate is a mild organic acid formed by the oxidation of glucose whereby the physiological d-form is produced. It is also called maltonic acid, and dextronic acid. It has the molecular formula $C_6H_{12}O_7$ and condensed structural formula $HOCH_2(CHOH)_4COOH$. It is one of the 16 stereoisomers of 2,3,4,5,6-pentahydroxyhexanoic acid. In aqueous solution at neutral pH, gluconic acid forms the gluconate ion and exists in equilibrium with the cyclic ester glucono delta lactone. Gluconic acid, gluconate salts, and gluconate esters occur widely in nature because such species arise from the oxidation of glucose.

The stain inhibitor can be provided in amounts from about 0.1-50 wt-% of the cleaning composition. In certain embodiments, the stain inhibitor can comprise from about 0.1-25 wt-% of the cleaning composition, about 1-25 wt-% of the cleaning composition, or about 1-10 wt-% of the cleaning composition.

EMBODIMENTS

Examples of suitable formulations for concentrated detergent compositions according to the invention are shown below in Table 1. The concentrated compositions can be formulated as liquids or solids.

TABLE 1

| Ingredient | First Exemplary Range (wt. %) | Second Exemplary Range (wt. %) | Third Exemplary Range (wt. %) |
|---|---|---|---|
| Alkalinity Source | 5-99% (active) | 10-50% (active) | 35-50% (active) |
| Alkylamino Hydroxy Acid and/or Secondary Amine | 0.01-40 wt. % | 0.25-20 wt. % | 0.5-10 wt. % |
| Surfactant | 0-50 wt. % | 0.01-40 wt. % | 0.1-30 wt. % |

The concentrated compositions can optionally include a hardening or solidification agent in a solid embodiment. In a liquid embodiment the concentrated composition can include water or another suitable diluent sufficient to achieve the desired concentration and viscosity. In a liquid concentrated composition, the water can comprise between about 20 wt. % and about 90 wt. %, preferably, between 50 wt. % and about 80 wt. %, more preferably between about 50 wt. % and about 70 wt. %.

The compositions can be concentrate compositions or may be diluted to form a use solution. In general, a concentrate refers to a composition that is intended to be diluted with water to provide a use solution that contacts an object to provide the desired cleaning, rinsing, or the like. The composition that contacts the surface(s) to be washed can be referred to as a concentrate or a use solution dependent upon the formulation employed in methods according to the invention. It should be understood that the concentration of the alkalinity source, an alkylamino hydroxy acid and/or secondary amine, surfactant, water, and other optional functional ingredients in the compositions will vary depending on whether the composition is provided as a concentrate or as a use solution.

A use solution may be prepared from the concentrate by diluting the concentrate with water at a dilution ratio that provides a use solution having desired alkalinity for the cleaning application, i.e., a specifically desired pH range. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

Examples of suitable concentrations for use solution compositions according to the invention are shown below in Table 2:

TABLE 2

| Ingredient | First Exemplary Range | Second Exemplary Range | Third Exemplary Range |
|---|---|---|---|
| Alkalinity Source | 0.001-12% (active) | 0.01-10% (active) | 0.1-6% (active) |
| Alkylamino Hydroxy Acid and/or Secondary Amine | 0.001-4 wt. % | 0.01-2 wt. % | 0.1-1 wt. % |
| Surfactant | 0-1000 ppm | 0-800 ppm | 0-750 ppm |
| Optional Oxidizer† | 0-5000 ppm | 0-3000 ppm | 0-2500 ppm |
| Water/Additional functional ingredients | q.s. | q.s. | q.s. |

†The oxidizer is not included in the compositions with the alkalinity source but can be used in the methods at the referenced concentrations or the use solution during the cleaning methods.

In certain embodiments, the solid cleaning composition is provided in the form of a unit dose. A unit dose refers to a solid cleaning composition unit sized so that the entire unit is used during a single cycle, for example, a single washing cycle of a warewash machine. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous cleaning compositions for multiple washing cycles. In certain embodiments, the solid cleaning composition is provided as a solid having a mass of about 5 g to about 10 kg. In certain embodiments, a multiple-use form of the solid cleaning composition has a mass of about 1 to about 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to about 500 g.

The components can be mixed and extruded or cast to form a solid such as pellets, powders or blocks. Heat can be applied from an external source to facilitate processing of the mixture.

A mixing system provides for continuous mixing of the ingredients at high shear to form a substantially homogeneous liquid or semi-solid mixture in which the ingredients are distributed throughout its mass. The mixing system includes means for mixing the ingredients to provide shear effective for maintaining the mixture at a flowable consistency, with a viscosity during processing of about 1,000-1,000,000 cP, preferably about 50,000-200,000 cP. The mixing system can be a continuous flow mixer or a single or twin screw extruder apparatus.

The mixture can be processed at a temperature to maintain the physical and chemical stability of the ingredients, such as at ambient temperatures of about 20-80° C., and about 25-55° C. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the scale control component may be separate Methods of Preparing the Compositions Cleaning composition according to the present invention may be made using a mixing process. The alkalinity source, an alkylamino hydroxy acid and/or secondary amine, surfactant, water, and optional ingredients are mixed for an amount of time sufficient to form a final, homogeneous composition. In an exemplary embodiment, the components of the cleaning composition are mixed for approximately 10 minutes. The compositions of the invention can be prepared in a multi-part system (non-premix), e.g., two-part system or three-part system. In such an embodiment, the parts can be in solid form, liquid form, or a combination thereof. For example, in a two-part system one part can be a solid and the other part can be a liquid. A multi-part system is preferred for embodiments of the invention including an oxidizer as the oxidizer is incompatible with the alkalinity source and/or secondary amine. In such an embodiment, the oxidizer can be applied before or after the step of applying the composition having an alkalinity source and/or secondary amine. Preferably, the oxidizer is added in a step after.

A solid cleaning composition as used in the present disclosure encompasses a variety of forms including, for example, solids, pellets, blocks, tablets, and powders. By way of example, pellets can have diameters of between about 1 mm and about 10 mm, tablets can have diameters of between about 1 mm and about 10 mm or between about 1 cm and about 10 cm, and blocks can have diameters of at least about 10 cm. It should be understood that the term "solid" refers to the state of the cleaning composition under the expected conditions of storage and use of the solid cleaning composition. In general, it is expected that the cleaning composition will remain a solid when provided at a temperature of up to about 100° F. or lower than about 120° F.

from the remainder of the warewash detergent. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate can be divided into useful sizes with a controlled mass. The extruded solid can be packaged in film. The temperature of the mixture when discharged from the mixing system can be sufficiently low to enable the mixture to be cast or extruded directly into a packaging system without first cooling the mixture. The time between extrusion discharge and packaging can be adjusted to allow the hardening of the cleaning composition for better handling during further processing and packaging. The mixture at the point of discharge can be about 20-90° C., and about 25-55° C. The composition can be allowed to harden to a solid form that may range from a low density, sponge-like, malleable, caulky consistency to a high density, fused solid, concrete-like block.

Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. Preferably, the temperature of the mixture during processing, including at the discharge port, is maintained preferably at about 20-90° C.

When processing of the ingredients is completed, the mixture may be discharged from the mixer through a discharge die. The solidification process may last from a few minutes to about six hours, depending, for example, on the size of the cast or extruded composition, the ingredients of the composition, the temperature of the composition, and other like factors. Preferably, the cast or extruded composition "sets up" or begins to harden to a solid form within about 1 minute to about 3 hours, preferably about 1 minute to about 2 hours, most preferably about 1 minute to about 1.0 hours minutes.

The concentrate can be provided in the form of a liquid. Various liquid forms include gels and pastes. Of course, when the concentrate is provided in the form of a liquid, it is not necessary to harden the composition to form a solid. In fact, it is expected that the amount of water in the composition will be sufficient to preclude solidification. In addition, dispersants and other components can be incorporated into the concentrate in order to maintain a desired distribution of components.

In aspects of the invention employing packaged solid cleaning compositions, the products may first require removal from any applicable packaging (e.g. film). Thereafter, according to certain methods of use, the compositions can be inserted directly into a dispensing apparatus and/or provided to a water source for cleaning according to the invention. Examples of such dispensing systems include for example U.S. Pat. Nos. 4,826,661, 4,690,305, 4,687,121, 4,426,362 and U.S. Pat. Nos. Re 32,763 and 32,818, the disclosures of which are incorporated by reference herein in its entirety. Ideally, a solid cleaning composition is configured or produced to closely fit the particular shape(s) of a dispensing system in order to prevent the introduction and dispensing of an incorrect solid product into the apparatus of the present invention. The packaging receptacle or container may be rigid or flexible, and composed of any material suitable for containing the compositions produced according to the invention, as for example glass, metal, plastic film or sheet, cardboard, cardboard composites, paper, and the like. The composition is processed at around 150-170° F. and are generally cooled to 100-150° before packaging. so that processed mixture may be cast or extruded directly into the container or other packaging system without structurally damaging the material. As a result, a wider variety of materials may be used to manufacture the container than those used for compositions that processed and dispensed under molten conditions.

In certain embodiments, the cleaning composition may be mixed with a water source prior to or at the point of use. In other embodiments, the cleaning compositions do not require the formation of a use solution and/or further dilution and may be used without further dilution.

In aspects of the invention employing solid cleaning compositions, a water source contacts the cleaning composition to convert solid cleaning compositions, particularly powders, into use solutions. Additional dispensing systems may also be utilized which are more suited for converting alternative solid detergents compositions into use solutions. The methods of the present invention include use of a variety of solid cleaning compositions, including, for example, extruded blocks or "capsule" types of package.

In an aspect, a dispenser may be employed to spray water (e.g. in a spray pattern from a nozzle) to form a cleaning use solution. For example, water may be sprayed toward an apparatus or other holding reservoir with the cleaning composition, wherein the water reacts with the solid cleaning composition to form the use solution. In certain embodiments of the methods of the invention, a use solution may be configured to drip downwardly due to gravity until the dissolved solution of the cleaning composition is dispensed for use according to the invention. In an aspect, the use solution may be dispensed into a wash solution of a ware wash machine.

In an aspect of the invention the compositions can be prepared prior to or at a hard surface being cleaned. For example, the compositions can be combined simulataneously or in a sequential order at a hard surface for cleaning. In such method of preparation, the composition can be formed when the components contact the hard surface to be cleaned. Further, this can occur prior to or with addition of water of dilution. In an aspect of the invention, a system having a plurality of inlets can introduce one or more of the components at a desired dosage to the hard surface such that the composition forms at the hard surface.

Methods of the Cleaning

The cleaning compositions of the invention are further suitable for use in cleaning surfaces from various applications and methods, including but not limited to, cleaning of clean-in-place (CIP) surfaces, clean-out-of-place (COP) surfaces, food processing surfaces (such as evaporators, heat exchangers, tanks, lines, separators, clarifiers, fine savers, contherms, scrape surfaces, and boilers). In addition, the methods of the invention are well suited for preventing and/or reducing staining and discoloration of aluminum and its alloys, nickel and its alloys, tin and its alloys, and some grades of stainless steel, including, 300 series stainless, 400 series stainless steel, and their alloys. The methods of the invention can reduce and/or prevent moderate to heavy staining, discoloration, and pitting of the cleaned surfaces.

In a beneficial aspect of the invention, the methods of the invention reduce and/or prevent discoloration and staining of stainless steel food and beverage equipment caused by combination of alkalinity and high temperature during the cleaning of the surface. Without being bound by the theory, it is believed that the combination of high temperature and alkalinity in existing cleaning methods can disrupt the passivation layer on the surface allowing the alkalinity to discolor, stain, and even pit the surface. It was found that the passivation layer was disrupted at both the liquid-gas interface and at the surface submerged in the liquid phase. It is believed that the passivation layer is disrupted as the liquid evaporates into the gas phase thereby increasing alkalinity concentration. This was evidenced by discoloration and corrosion at the interface. As the passivation layer protects the surface from staining, discoloration, and pitting, the disruption of the passivation layer leaves the surface vulnerable to the corrosive nature of the caustic ingredients. The corroded surface damages the aesthetic appearance of the surface. Without wishing to be bound by the theory, it is believed that the cleaning compositions and methods of the invention prevent disruption of the passivation layer on the surface thereby preventing and/or reducing the discoloration, staining, and pitting of the surface. It is believed that the cleaning compositions of the invention can provide a protective layer over the passivation layer, thereby preventing and/or reducing the discoloration, staining, and pitting of the surface.

The cleaning compositions of the invention may be in the form of a liquid or solid. Solid compositions include extruded, pressed or cast solids. The compositions are suitable for use at temperature ranges typically used in warewash applications (e.g., about 120° F. to about 180° F.) or the temperature range for the surface being cleaned (e.g., a boiler at temperatures near or exceeding the boiling temperature of water, i.e., around or even greater than about 212° F.).

According to an embodiment of the invention, a metal surface is contacted by a cleaning composition. The cleaning composition may be in a concentrate or a diluted form. Contacting can include any of numerous methods known by those of skill in the art for applying a compound or composition of the invention, such as spraying, immersing the metal surface in the cleaning composition or use solution, dispensing the cleaning composition over a surface in granular or particulate form, simply pouring the cleaning composition or a use solution onto or into the food process surface, rinsing the food processing surface with a use solution, or a combination thereof. The methods can be performed by adding the compositions to a CIP unit, COP unit, warewash machine, or directly to ware or the soiled metal surface.

The compositions according to the invention can be provided as a solid, liquid, or a combination thereof. As set forth in the description of the compositions, the compositions can be provided in one or more parts, such as the formulation of the composition to include the alkalinity source, an alkylamino hydroxy acid and/or secondary amine, surfactant, water, and optional ingredients. Alternatively, the cleaning composition may be provided in two or more parts (non-premix), such that the overall composition is formed in the use solution upon combination of two or more compositions. Each of these embodiments are included within the following description of the methods of the invention.

If using a non-premixed composition, e.g., a composition that does not contain the alkylamino hydroxy acid and/or secondary amine, then the composition can be mixed immediately prior to use or at the point of use. For example, a use solution can be prepared and then contacted to the soiled metal surface. Another example is that the different components can be added separately directly to the soiled surface to form the use solution.

A benefit of the compositions and methods of the invention is the prevention and/or reduction of discoloration, staining, corrosion, and/or pitting of the hard surface being cleaned. For example, in embodiments of the invention, a hard surface can have less than 15%, preferably less than 10%, more preferably less than 5%, most preferably less than 3% of its surface area increase in discoloration, staining, corrosion, and/or pitting after at least two cleaning cycles with a cleaning solution having a pH between about 9 and about 14 containing a hydroxide-based alkalinity source.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Materials and Suppliers

The following materials were employed in the Examples for evaluation of stainless steel corrosion inhibition of the compositions:

3-n-butylamino-2-hydroxysuccinic acid, an exemplary alkylamino hydroxy acid;

dimethyl amine, an exemplary secondary amine; and

NaOH—sodium hydroxide as a control.

Procedure to Test Stainless Steel Corrosion

Stainless steel coupons were obtained having a size of approximately 3"×1"×1/16". The coupons were cleaned and passivated prior to testing to simulate field equipment. The coupons were scrubbed with a polishing cleanser and then rinsed with distilled water. Next, the coupons were placed in a beaker, covered with toluene and sonicated at ambient temperature for 30 minutes to remove any adhesive or oils. After the coupons were rinsed with acetone and then dried. The coupons were then sonicated in a 15% diammonium citrate solution for 20 minutes at 150° F. After sonication they were rinsed with distilled water and stored in a desiccator until dry.

Stock solutions of the compositions to be tested were prepared. Next a sample bottle was filled with approximately 115 g of a test solution and a stainless steel coupon was suspended into the solution so that approximately ¾ of the coupon on all sides was immersed in the solution. Each test solution was run in triplicate for each type of stainless steel coupon.

Sample bottles were placed uncovered in an oven at 80° C. to allow the test solutions to evaporate and create a high concentration "dry-down" effect. Solutions and coupons remained uncovered in the oven for a test period. After the test period, the coupons were removed from the bottles and rinsed with distilled water.

The coupons were then evaluated for any staining/discoloration and photographed. Image analysis was performed with Figi Image J Software for quantitative comparisons.

Stainless steel images were scanned using color and grey scale. The grey scale images were used for the Fiji image analysis evaluation.

During image analysis, a threshold value of 145 was chosen. The total threshold range is from 0 to 255, where a value of 255 reads all black pixels and a value of 0 reads all white pixels on the coupon. A threshold value of 145 maximizes the dynamic range across the compositions in the result analysis. This value allowed for no/minimal discoloration on a new coupon and adequately captured the discoloration on the negative control.

Once the threshold value was set, the entire coupon area was selected and the area was measured for percent discoloration. The percent discoloration was averaged across the three coupons in each formulation. Formulations with a lower percent discoloration across the coupon denotes improved performance.

Example 1

Figure 1B:
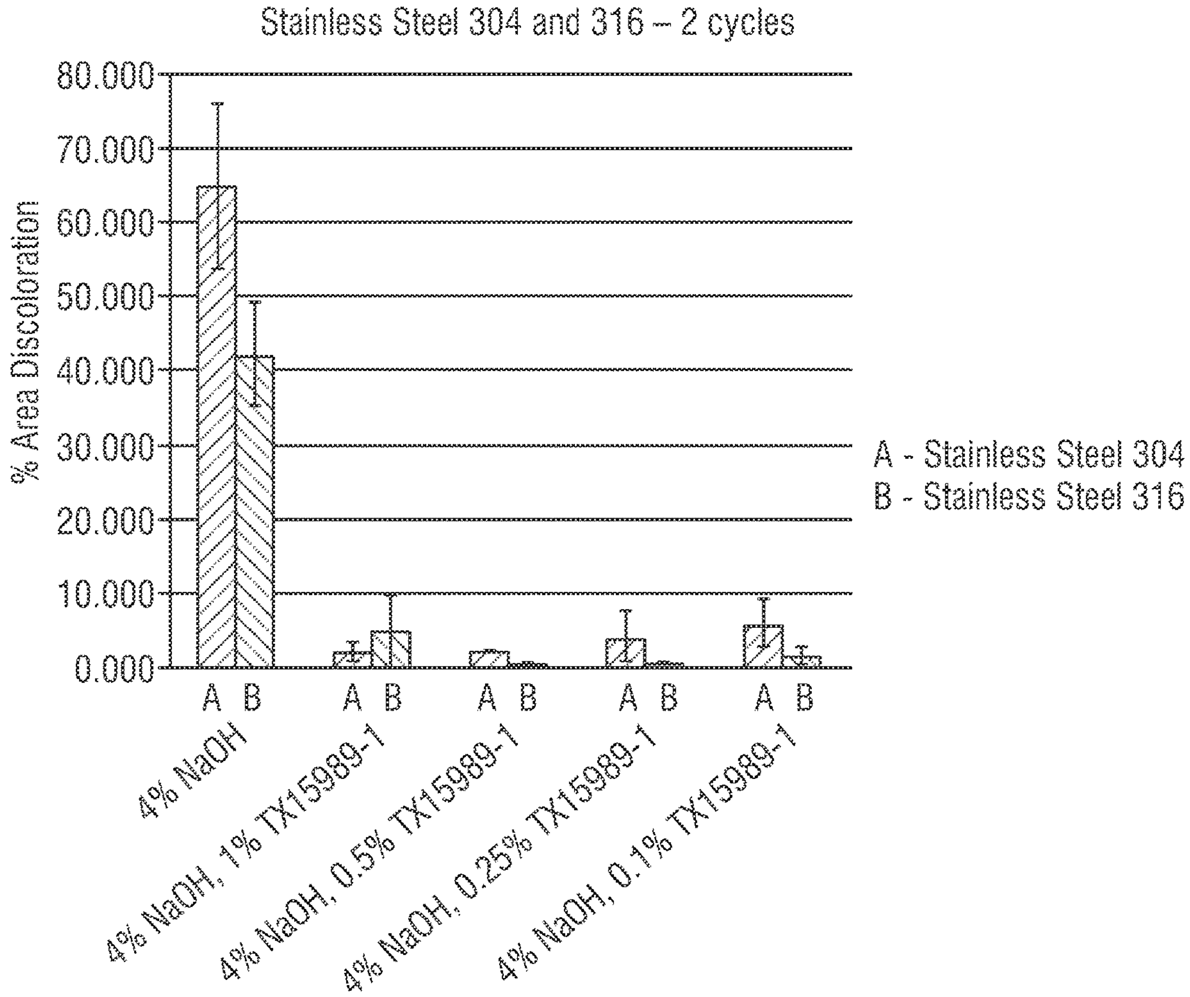
Figure 1C:
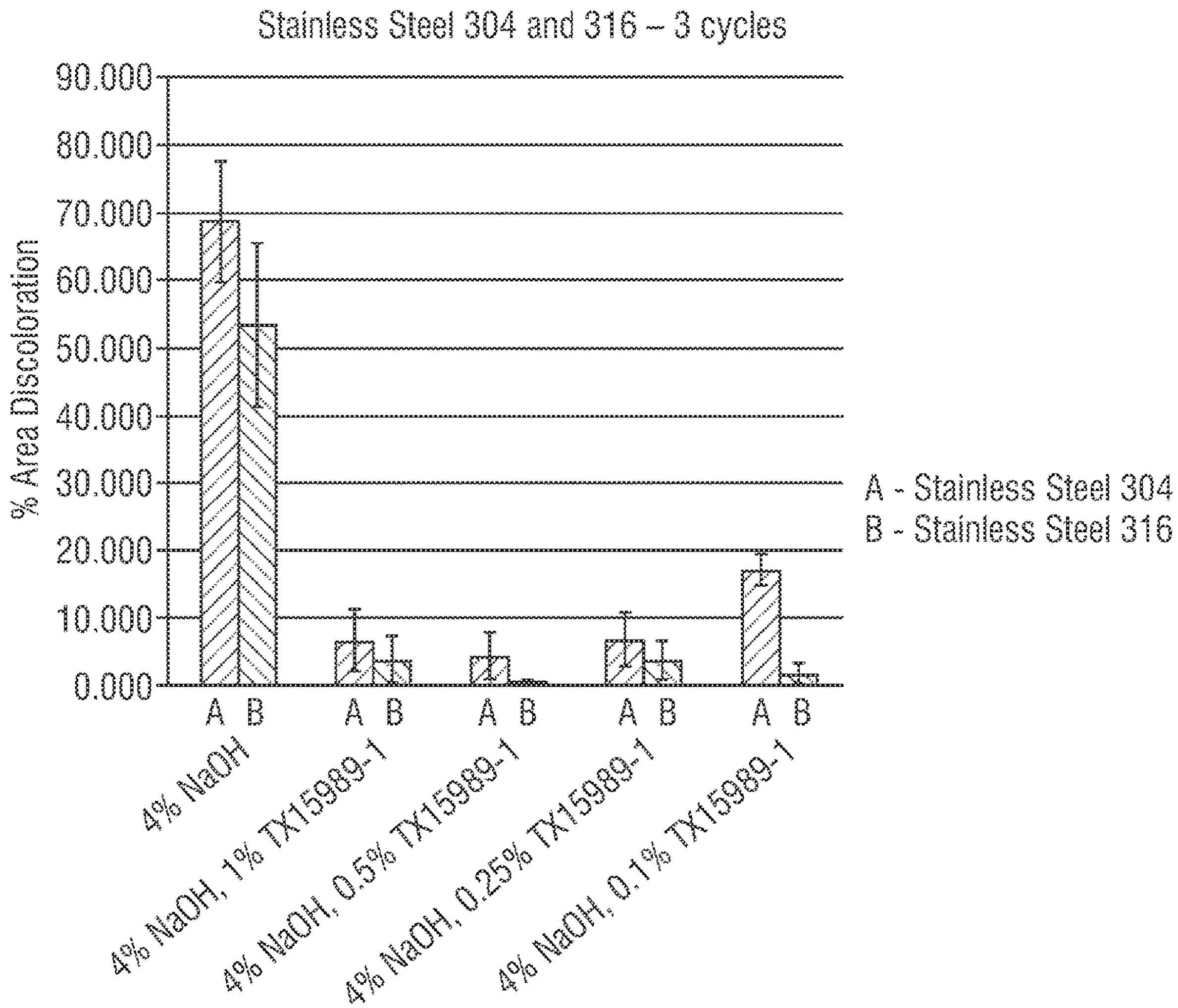

The concentration of alkaline-butyl amine was examined. Varying concentrations of 3-n-butylamino-2-hydroxysuccinic acid were compared with a control solution, i.e. a 4% (active) NaOH solution. Five exemplary compositions of the invention were prepared with 4% (active) NaOH and concentrations of the acid in active amounts of, 0.1%, 0.25%, 0.5%, and 1%. The evaluation was carried out for a three week period, the stain for each solution on stainless steel series 304 and stainless steel series 316 was read and analyzed at the end of each week. The results of the quantification analysis are provided in FIGS. 1A-1C. The results show that the formulations containing the hydroxycarboxylic acid each reduced the discoloration compared with the control.

Example 2

Figure 2:
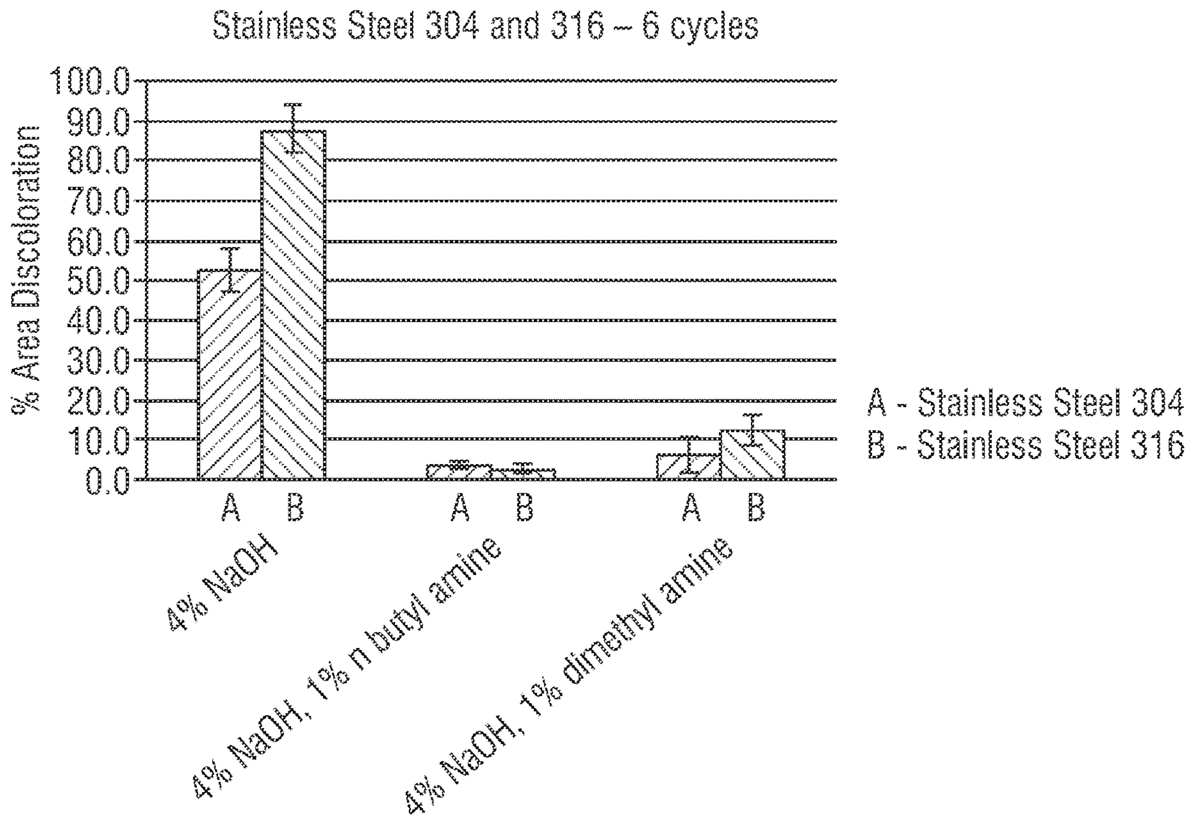
FIG. 2 shows the percent discoloration of stainless steel series 304 and 316 coupons after being subjected to 4% (active) NaOH for six weeks and comparing the effect of an exemplary alkylamino hydroxy acid (n-butyl amine at 1% active) and an exemplary secondary amine (dimethyl amine at 1% active). Data series A is represents stainless steel series 304 and data series B represents stainless steel series 316.

Exemplary compositions of the invention were tested in comparison to a control solution of 4% active NaOH. One exemplary composition of the invention contained 1% (active) n-butyl amine and 4% (active) NaOH. Another exemplary composition of the invention contained 4% (active) NaOH and 1% (active) dimethyl amine. The evaluation was carried out for a 6 week period on stainless steel series 304 and stainless steel series 316. The stain for each solution was read and analyzed at the end of the sixth week. The test results for the control solutions and the exemplary solution is summarized in FIG. 2.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A cleaning system for clean-in-place surfaces comprising:

a clean-in-place unit comprising one or more surfaces; wherein the one or more surfaces comprise aluminum, an aluminum alloy, nickel, a nickel alloy, tin, a tin alloy, 300 series stainless steel, a 300 series stainless steel alloy, 400 stainless steel, or a 400 stainless steel alloy;

an alkalinity source in fluid communication with the one or more surfaces; wherein the alkalinity source comprises an alkali metal hydroxide;

an alkylamino hydroxy acid in fluid communication with the one or more surfaces, wherein the alkylamino hydroxy acid comprises one or more 3-alkylamino-2-hydroxysuccinic acid compounds and/or salts thereof;

water in fluid communication with the one or more surfaces;

wherein the alkalinity source and alkylamino hydroxy acid are in separate parts, and wherein the alkalinity source, alkylamino hydroxy acid, and water form an aqueous cleaning solution having a pH of at least 11.

2. The system of claim 1, wherein the alkalinity source, alkylamino hydroxyacid, and water form a multi-part cleaning composition.

3. The system of claim 2, wherein the alkalinity source comprises between about 35 wt. % and about 50 wt. % (active) of the cleaning composition; and wherein the alkylamino acid comprises between about 0.5 wt. % and about 10 wt. % of the cleaning composition.

4. The system of claim 3, wherein the cleaning composition further comprises a surfactant in fluid communication with the one or more surfaces; wherein the surfactant comprises between about 0.01 wt. % and about 40 wt. % of the cleaning composition.

5. The system of claim 4, wherein the surfactant is selected from the group consisting of nonionic surfactants, cationic surfactants, amphoteric surfactants, zwitterionic surfactants, anionic surfactants, and combinations thereof.

6. The system of claim 1, further comprising an oxidizer in fluid communication with the one or more surfaces, wherein the oxidizer is in a separate part from the alkalinity source.

7. The system of claim 3, wherein the alkylamino hydroxy acid is 3-n-butylamino-2-hydroxysuccinic acid and/or salt thereof.

8. The system of claim 3, wherein the alkalinity source is dispensed to the one or more surfaces in the aqueous cleaning solution at a concentration of between about 0.001% (active) and about 12% (active).

9. The system of claim 3, wherein the alkyl amino hydroxy acid is dispensed to the one or more surfaces in the aqueous cleaning solution at a concentration of between about 0.001% (active) and about 4% (active).

10. The system of claim 3, wherein the alkylamino hydroxy acid is dispensed in the aqueous cleaning solution at a concentration of between about 0.01% (active) and about 1% (active), and wherein the alkalinity source is dispensed in the aqueous cleaning solution at a concentration of between about 0.1% (active) and about 6% (active).

11. A cleaning system for clean-out-of-place surfaces comprising:

a clean-out-of-place unit comprising one or more surfaces; wherein the one or more surfaces comprise aluminum, an aluminum alloy, nickel, a nickel alloy, tin, a tin alloy, 300 series stainless steel, a 300 series stainless steel alloy, 400 stainless steel, or a 400 stainless steel alloy;

an alkalinity source in fluid communication with the one or more surfaces; wherein the alkalinity source comprises an alkali metal hydroxide;

an alkylamino hydroxy acid in fluid communication with the one or more surfaces, wherein the alkylamino hydroxy acid comprises one or more 3-alkylamino-2-hydroxysuccinic acid compounds and/or salts thereof;

water in fluid communication with the one or more surfaces;

wherein the alkalinity source and alkylamino hydroxy acid are in separate parts, and wherein the alkalinity source, alkylamino hydroxy acid, and water form an aqueous cleaning solution having a pH of at least 11.

12. The system of claim 11, wherein the alkalinity source, alkylamino hydroxyacid, and water form a multi-part cleaning composition.

13. The system of claim 12, wherein the alkalinity source comprises between about 35 wt. % and about 50 wt. % (active) of the cleaning composition; wherein the alkylamino acid comprises between about 0.5 wt. % and about 10 wt. % of the cleaning composition.

14. The system of claim 13, wherein the cleaning composition further comprises a surfactant in fluid communication with the one or more surfaces; wherein the surfactant comprises between about 0.01 wt. % and about 40 wt. % of the cleaning composition.

15. The system of claim 14, wherein the surfactant is selected from the group consisting of nonionic surfactants, cationic surfactants, amphoteric surfactants, zwitterionic surfactants, anionic surfactants, and combinations thereof.

16. The system of claim 11, further comprising an oxidizer in fluid communication with the one or more surfaces, wherein the oxidizer is in a separate part from the alkalinity source.

17. The system of claim 13, wherein the alkylamino hydroxy acid is 3-n-butylamino-2-hydroxysuccinic acid and/or salt thereof.

18. The system of claim 13, wherein the alkalinity source is dispensed to the one or more surfaces in the aqueous cleaning solution at a concentration of between about 0.001% (active) and about 12% (active).

19. The system of claim 13, wherein the alkyl amino hydroxy acid is dispensed to the one or more surfaces in the aqueous cleaning solution at a concentration of between about 0.001% (active) and about 4% (active).

20. The system of claim 13, wherein the alkylamino hydroxy acid is dispensed in the aqueous cleaning solution at a concentration of between about 0.01% (active) and about 1% (active), and wherein the alkalinity source is dispensed in the aqueous cleaning solution at a concentration of between about 0.1% (active) and about 6% (active).

* * * * *